United States Patent [19]
Jun

[11] Patent Number: 6,147,717
[45] Date of Patent: Nov. 14, 2000

[54] DISPLAY SERVICE FOR DISPLAYING VIDEO IMAGES OF MULTIPLE CHANNELS ON A SCREEN

[75] Inventor: Sung-Gon Jun, Suwon, Rep. of Korea

[73] Assignee: Samsung Electronics Co., Esq., Suwon, Rep. of Korea

[21] Appl. No.: 08/953,189

[22] Filed: Oct. 17, 1997

[30] Foreign Application Priority Data

Oct. 17, 1996 [KR] Rep. of Korea ...................... 96-46520

[51] Int. Cl.$^7$ .............................. H04N 5/445; H04N 5/45
[52] U.S. Cl. ...................... 348/588; 348/584; 348/564; 348/567; 348/598
[58] Field of Search ................................ 358/444, 409, 358/410, 450; 348/564, 565, 567, 588, 598, 584; H04N 5/445, 5/45

[56] References Cited

U.S. PATENT DOCUMENTS

| | | | |
|---|---|---|---|
| 4,729,028 | 3/1988 | Micic | 348/588 |
| 4,843,471 | 6/1989 | Yazawa et al. | 358/160 |
| 4,855,833 | 8/1989 | Kageyama et al. | 348/588 |
| 4,858,009 | 8/1989 | Vos et al. | 358/148 |
| 4,984,082 | 1/1991 | Okamura | 348/565 |
| 5,045,946 | 9/1991 | Yu . | |
| 5,065,230 | 11/1991 | Kumano et al. | 348/588 |
| 5,093,726 | 3/1992 | Chun | 348/565 |
| 5,161,012 | 11/1992 | Choi | 348/564 |
| 5,262,866 | 11/1993 | Hong | 348/564 |
| 5,365,278 | 11/1994 | Willis | 348/588 |
| 5,537,152 | 7/1996 | Ishikawa | 348/564 |
| 5,576,769 | 11/1996 | Lendaro | 348/564 |
| 5,642,498 | 6/1997 | Kutner | 395/509 |
| 5,729,300 | 3/1998 | Ahn | 348/564 |
| 5,825,222 | 10/1998 | Omori | 327/156 |

*Primary Examiner*—Cheukfan Lee
*Attorney, Agent, or Firm*—Robert E. Bushnell, Esq.

[57] ABSTRACT

A display device includes a plurality of input timing control circuits for generating a plurality of first clock signals in synchronization with a corresponding plurality of horizontal synchronization signals received via multiple channels, an output timing control circuit coupled to receive the first clock signals for generating a second clock signal, and a plurality of video memory circuits for storing a plurality of digital video data received via the multiple channels. The writing operations of the video memory circuits are respectively controlled by the plurality of input timing control circuits and the reading operation of each of the video memory circuits is controlled by the output timing control circuit. The display device further includes an output buffer memory circuit coupled to the video memory circuits for storing the plurality of digital video data from the video memory circuits. The writing and reading operations of the output buffer memory circuit are controlled by the output timing control circuit in synchronization with the second clock signal. The second clock signal has a frequency which is higher than the highest of frequencies of the first clock signals such that multiple video images which corresponds to the video data received via multiple channels can be simultaneously displayed on a video monitor.

8 Claims, 3 Drawing Sheets

DISPLAY SERVICE FOR DISPLAYING VIDEO IMAGES OF MULTIPLE CHANNELS ON A SCREEN

CLAIM FOR PRIORITY

This application makes reference to, incorporates the same herein, and claims all benefits accruing under 35 U.S.C. §119 from an application for DISPLAY APPARATUS FOR DISPLAYING VIDEO IMAGES OF MULTIPLE CHANNELS ON A DISPLAY SCREEN earlier filed in the Korean Industrial Property Office on the of Oct. 17$^{th}$ 1996, and there duly assigned Serial No. 46520/1996, a copy of which application is annexed hereto.

BACKGROUND OF THE INVENTION

1. Technical Field

The present invention relates to a display device, more particularly, to a multiple-channel video image display device capable of displaying a plurality of video images, which are received via a plurality of channels, on a single screen.

2. Related Art

Display devices such as cathode-ray tube (CRT), liquid crystal display (LCD) or plasma type display monitors are widely used to display video images generally a single video image at a given time. Many contemporary television receivers as disclosed, for example, in U.S. Pat. No. 4,729,028 for Television Receiver With Multipicture Display issued to Micic et al., U.S. Pat. No. 4,855,833 for Television Channel Selection Apparatus Employing Multi-Picture Display issued to Kageyama et al., U.S. Pat. No. 4,984,082 for Circuit For Displaying Picture Of Multiple Channels issued to Okamura, U.S. Pat. No. 5,045,946 for Method For Multi-Screen Operation In A Picture-In-Picture System issued to Yu, U.S. Pat. No. 5,065,230 for Video Signal Processor For Simultaneously Reproducing A Plurality Of Video Information On A Single Monitor Picture Tube issued to Kumano et al., U.S. Pat. No. 5,093,726 for Multi-Type Multi-Channel Selector issued to Chun, U.S. Pat. No. 5,161,012 for Multi-Screen Generation Circuit issued to Choi, U.S. Pat. No. 5,262,866 for Method For Displaying A Plurality Of Sequential Video Images In A Multi-Screen Picture issued to Hong, U.S. Pat. No. 5,365,278 for Side By Side Television Receiver issued to Willis, U.S. Pat. No. 5,537,152 for Television Receiver For Displaying Registered Broadcast Channels In Display Segments And A Channel Selector Having Similar Segments issued to Ishikawa, and U.S. Pat. No. 5,576,769 for Automatic Synchronization Switch For Side-By-Side Displays issued to Lendaro, are now equipped with picture-in-picture features capable of providing a visual display of a plurality of video images on a screen.

Recent advances in multimedia technology also allow more than one or multiple video images from different video sources to be simultaneously displayed on a single display device of a computer system. Such multiple video images are typically displayed in separated windows on the display device. Generally, synchronization frequencies of different images must be identical, and video signals of different images must be selected for a simultaneous display on the display device. If the synchronization frequencies of the selected images to be displayed on the display device are slightly different from each other, the visual display of multiple images on the display device is corrupted. For this reason, further advance in the image selection and synchronization is necessary to ensure that multiple images are reliably displayed on the display device.

SUMMARY OF THE INVENTION

Accordingly, it is therefore an object of the present invention to provide an improved display device for multiple video images.

It is also an object to provide a display device capable of simultaneously displaying multiple video images corresponding to video data received via a plurality of channels on a single monitor.

These and other objects of the present invention can be achieved by a display device which includes a plurality of input timing control circuits for generating a plurality of first clock signals in synchronization with a corresponding plurality of horizontal synchronization signals received via multiple channels, respectively; an output timing control circuit coupled to receive the first clock signals for generating a second clock signal; and a plurality of video memory circuits for storing a plurality of digital video data which are received via the channels and synchronized with the horizontal synchronization signals, respectively. Writing operations of the video memory circuits are respectively controlled by the plurality of input timing control circuits in synchronization with the corresponding first clock signals and reading operations of the video memory circuits are controlled by the output timing control circuit in synchronization with the second clock signal. The second clock signal has a frequency which is higher than the highest of frequencies of the first clock signals. An output buffer memory circuit are then coupled to the video memory circuits to store the plurality of digital video data from the video memory circuits. Writing and reading operations of the output buffer memory circuit are controlled by the output timing control circuit in synchronization with the second clock signal therefrom. Although the horizontal synchronization signals respectively have frequencies which are different from each other, multiple video images which corresponds to the video data received via a plurality of channels can be simultaneously displayed on a single monitor since the frequency of the second clock signal is higher than the highest of frequencies of the first clock signals.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
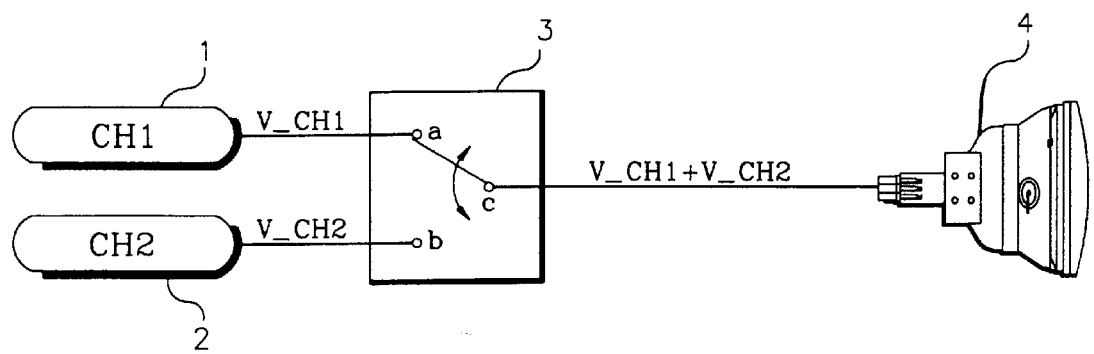
FIG. 1 is a schematic block diagram of a typical display device for displaying two images on a screen.

Referring now to the drawings and particularly to FIG. 1, which illustrates a typical display device for providing a visual display of two images of which synchronization frequencies are equal on a screen. As shown in FIG. 1, the display device includes a video selection circuit 3 for selecting between, for example, two video signals V_CH1 and V_CH2 input via two channels 1 and 2 for a visual display on a monitor 4.

Figure 2A:
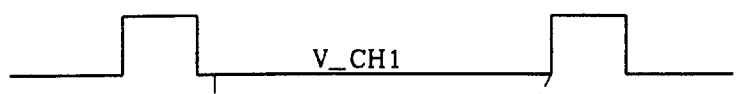
FIGS. 2A–2C are timing diagrams of the two images with respect to horizontal synchronization frequencies of the two source video signals of FIG. 1.
Figure 2B:
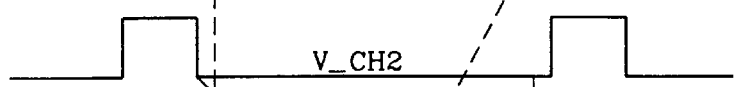
Figure 2C:
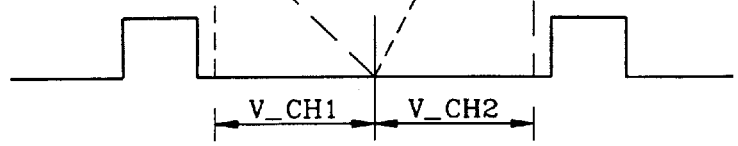

FIGS. 2A–2C illustrate timing diagrams of the two images with respect to horizontal synchronization frequencies of two source video signals V_CH1 and V_CH2 of FIG. 1. FIGS. 2A and 2B show the horizontal synchronization signals for source video signals V_CH1 and V_CH2 inputted through two channels 1 and 2, respectively, and FIG. 2C shows a horizontal synchronization signal in relation to output video signal of the video selection circuit 3. Assuming that the horizontal synchronization frequencies the video signals V_CH1 and V_CH2 are f1 and f2, respectively, the switching frequency f of the video selection circuit 3 is (f1*f2)/(f1+f2). For simultaneous display of the two images on the display device 4, however, the horizontal synchronization frequency f1 may be equal to the frequency f2, as shown in FIG. 2. If the horizontal synchronization frequencies f1 and f2 are different from each other, it will be impossible to display the images on the display device simultaneously.

Figure 3:
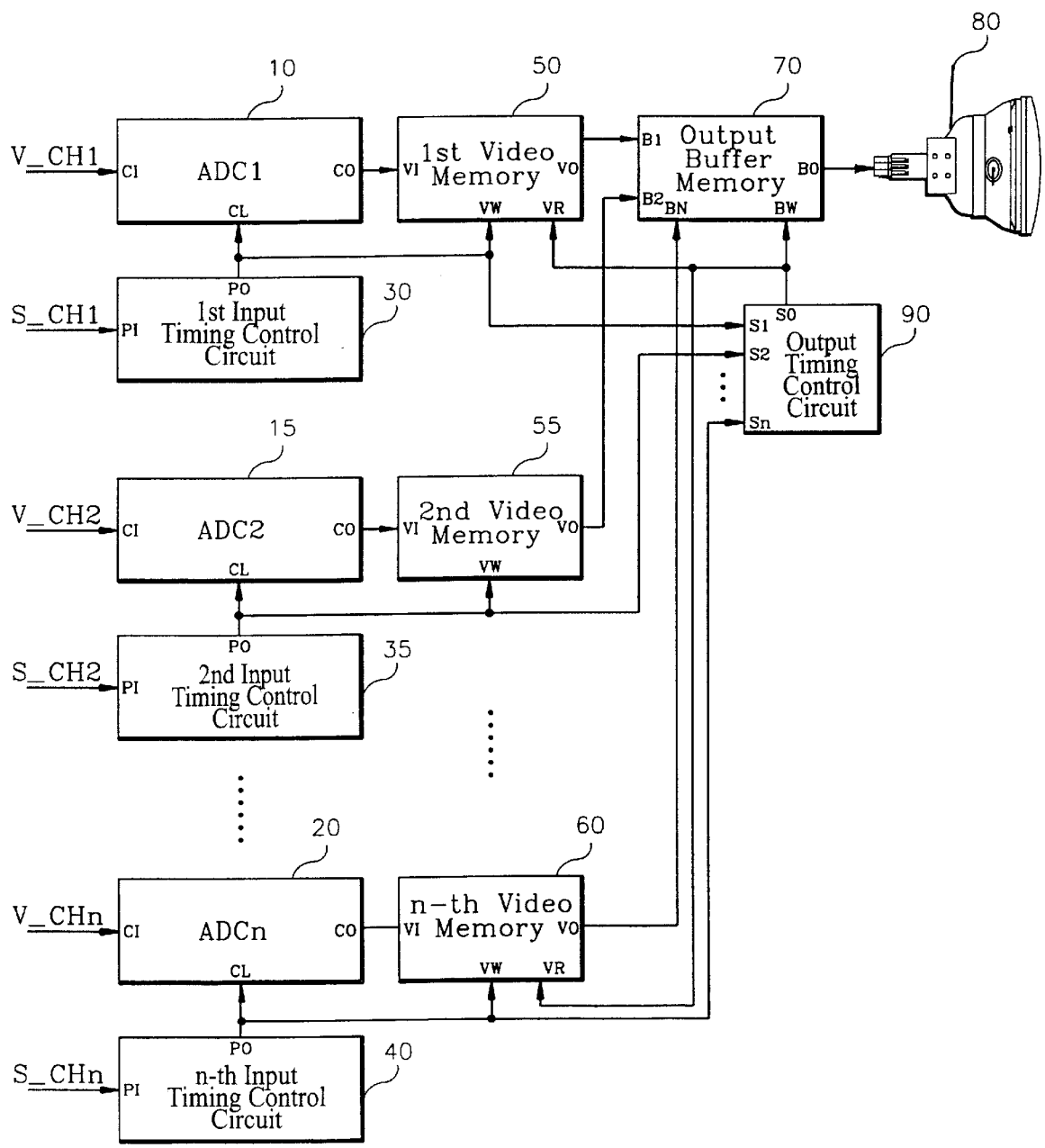
FIG. 3 illustrates a display device constructed according to the principles of the present invention.

Turning now to FIG. 3, which illustrates a display device constructed according to the principles of the present invention. As shown in FIG. 3, the display device includes a plurality of analog-to-digital converters (ADC1–ADCN) 10, 15 . . . 20, a plurality of input timing control circuits 30, 35 . . . 40, a plurality of video memory circuits 50, 55 . . . 60, an output buffer memory circuit 70 for providing a visual display of selected multiple video images on monitor 80, and an output timing control circuit 90.

Generally, the display device receives a plurality of analog video signals V_CH1, V_CH2 . . . V_CHn and a plurality of horizontal synchronization signals S_CH1, S_CH2 . . . S_CHn from different video sources (not shown) through a plurality of channels CH1, CH2 . . . CHn, respectively. Each of the video signals V_CH1, V_CH2, . . . , and V_CHn is applied to the monitor 80 in synchronization with a corresponding horizontal synchronization signals S_CH1, S_CH2 . . . or S_CHn. It will be appreciated that the video signals may be either composite or component signals. For purposes of explanation, it will be appreciated that the frequencies of the horizontal synchronization signals S_CH1, S_CH2 . . . and S_CHn could be different from each other.

The analog video signals V_CH1, V_CH2 . . . and V_CHn are input to a plurality of analog-to-digital converters (ADC1–ADCn) 10, 15, 20. The horizontal synchronization signals S_CH1, S_CH2 . . . S_CHn are inputted into a plurality of input timing control circuits 30, 35, 40, respectively. The ADC1–ADCn 10, 15, 20 are coupled to a corresponding plurality of video memory circuits 50, 55, 60, respectively. Each of the input timing control circuits 30, 35, 40 is dedicated to generating a clock signal (first clock signal) in synchronization with a corresponding horizontal synchronization signal S_CH1, S_CH2 . . . or S_CHn. The first clock signals are phase-locked to the horizontal synchronization signals, respectively. Further, each of the input timing control circuits 30, 35, 40 generates address and control information in relation to the writing operation of a corresponding video memory circuit 50, 55, 60. The ADC1–ADCn 10, 15, 40 each converts a corresponding analog video signal V_CH1, V_CH2 . . . or V_CHn into a digital video data representing pixel value (or pixel values) in synchronization with a corresponding first clock signal.

The video memory circuit 50, 55, 60 store the output data of the ADC1–ADCn 10, 15, 20 in response to the address and control information and in synchronization with the first clock signals from the input timing control circuits 30, 35, 40, respectively.

All of the first clock signals from the input timing control circuits 30, 35, 40 are applied to an output timing control circuit 90. This timing control circuit 90 is provided to generate a clock signal (second clock signal), address and control information with respect to reading operation of each of the video memory circuits 50, 55, 60. The second clock signal has a frequency which is higher than the highest of frequencies of the first clock signals. The output timing control circuit 90 controls the reading operation of each of the video memory circuits 50, 55, 60. Then, the reading operations of the video memory circuits 50, 55, 60 are performed in synchronization with the second clock signal from the control circuit 90. All outputs of the video memory circuits 50, 55, 60 are applied to an output buffer memory circuit 70.

In addition, the output timing control circuit 90 generates address and control information with regard to reading and writing operations of the output buffer memory circuit 70. The second clock is used for the reading and writing operations of the output buffer memory circuit 70. The output buffer memory circuit 70 is controlled by the output timing control circuit 90 so as to store the digital video data from all video memory circuits 50, 55, 60 in synchronization with the second clock signal from the control circuit 90. Also, the reading operation of the output buffer memory circuit 70 is controlled by the output timing control circuit 90 and is performed in synchronization with the second clock signal from the control circuit 90.

The video data output from the output buffer memory circuit 70 are provided to the video monitor 80 such as a CRT, LCD or plasma type display. The video monitor 80 simultaneously displays multiple video images on the basis of the digital video data from the output buffer memory circuit 70 on a screen.

Figure 4:
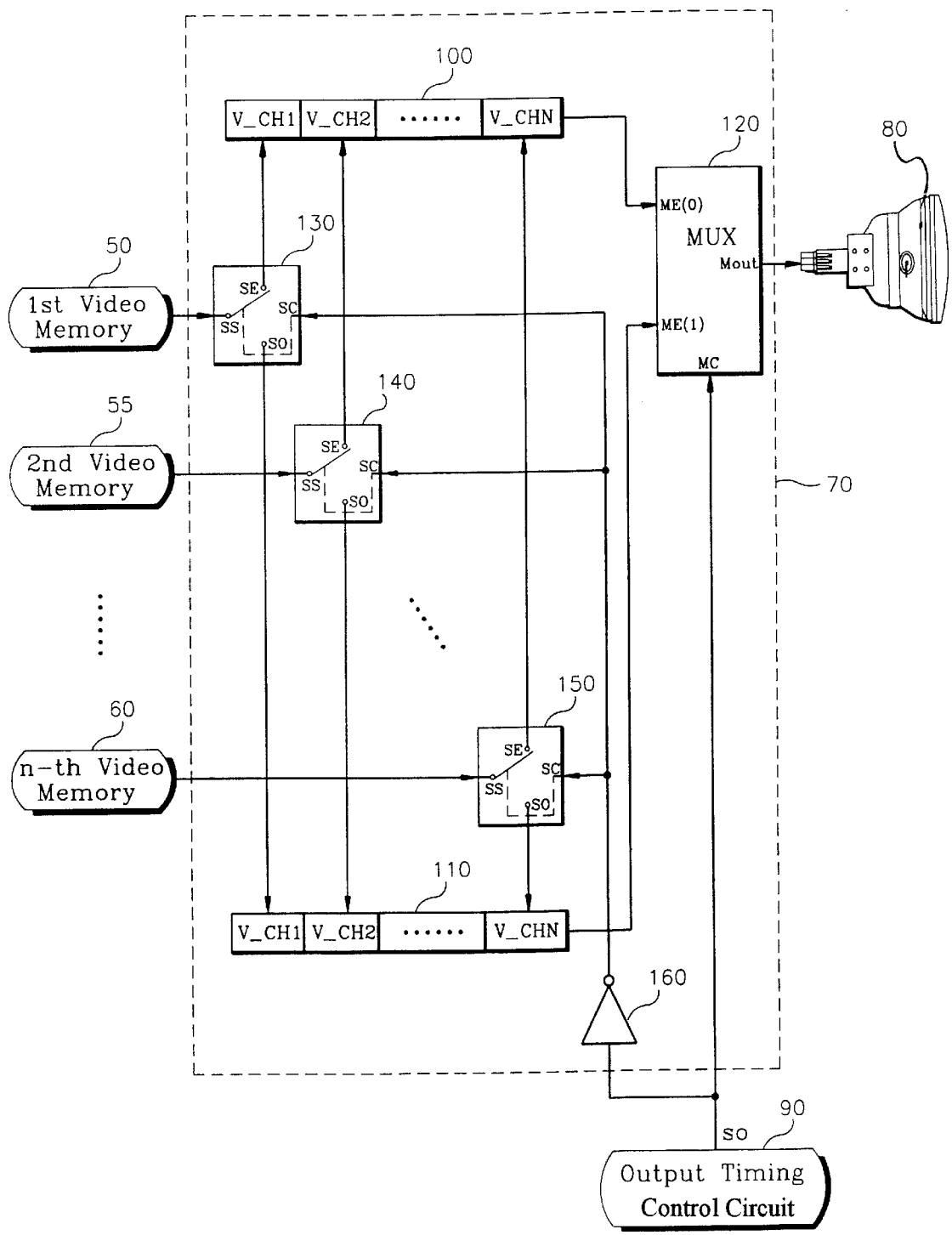
FIG. 4 is a detailed circuit diagram of the output buffer memory circuit of FIG. 3.

FIG. 4 illustrates a detailed circuit configuration of the output buffer memory circuit 70. The output buffer memory circuit 70 includes 2 buffer memories 100 and 110, n 1×2 demultiplexers 130, 140, . . . , and 150 respectively corresponding to video memory circuits 50, 55, . . . , and 60, an inverter 160, and a 2×1 multiplexer 120.

Each of the buffer memories 100 and 110 is large enough in storage capacity to store the video data from the video memory circuits 50, 55, 60. For example, if the display device 80 provides a resolution of 1280×1024, each of the buffer memories 100 and 110 will be large enough to store the video data for multiple video images displayed on the video monitor 80.

In accordance with the control of the output timing control circuit 90, the reading operation of the buffer memory 100 can be performed while the writing operation of the buffer memory 110 is performed, and vice versa. The demultiplexers 130, 140, 150 are controlled by the output timing control circuit 90 and provides a data path between the video memory circuits 50, 55, 60 and the buffer memories 100 and 110 in turn. Likewise, the multiplexer 120 is also controlled by the output timing control circuit 90 and provides a data path between the buffer memories 100 and the video display 80 in turn. Specifically, for example, when a control signal SO from the output timing control circuit 90 is at low level., the demultiplexers 130, 140, 150 provides a data path between the video memory circuits 50, 55, 60 and the buffer memory 100. In this case, a data input port SS of each of demultiplexers 130, 140,150 is connected to a data output port SE thereof. The video data from the video memory circuits 50, 55, 60 are thus stored in the buffer memory 100. Further, the multiplexer 120 provides a data path between the buffer memory 110 and the display device 80 so that the video data from the buffer memory 110 is applied to the video monitor 80. On the other hand, when the control signal SO goes to high level, the data input port SS of each of demultiplexers 130, 140, 150 is connected to a data output port SO thereof so that the demultiplexers 130,140, 150 provide a data path between the video memory circuits 50, 55, 60 and the buffer memory. Therefore, the video data from the video memory circuits 50, 55, 60 are stored in the buffer memory 110 and 110. In this case, the multiplexer 120 provides a data path between the buffer memory 100 and the 8 display device 80 so that the video data from the buffer memory 100 is applied to the video monitor 80.

As described above, each of multiple video data from different video sources, which is synchronized with a corresponding horizontal synchronization signal, is stored in a corresponding memory in synchronization with a clock signal of which frequency is equal to that of the corresponding horizontal synchronization signal. Then, the stored data are simultaneously read from all video memories, in synchronization with another clock signal having a frequency which is higher than the highest of the frequencies of the horizontal synchronization signals. This allows for the simultaneous visual display of multiple video images having different synchronization frequencies on a display device.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A display device for displaying video images of a plurality of channels, comprising:

a plurality of input timing control circuits for generating a plurality of first clock signals in synchronization with a corresponding plurality of horizontal synchronization signals received via communication channels, respectively;

an output timing control circuit coupled to receive the first clock signals, for generating a second clock signal;

a plurality of video memory circuits for storing a plurality of digital video data which are received via the channels and synchronized with the horizontal synchronization signals, respectively, wherein writing operations of said video memory circuits are respectively controlled by said plurality of input timing control circuits in synchronization with the corresponding first clock signals and reading operations of said video memory circuits are controlled by said output timing control circuit in synchronization with the second clock signal; and an output buffer memory circuit coupled to said video memory circuits, for storing the plurality of digital video data from said video memory circuits, wherein writing and reading operations of said output buffer memory circuit are controlled by said output timing control circuit in synchronization with the second clock signal therefrom.

2. The display device of claim 1, further comprised of said horizontal synchronization signals respectively exhibiting frequencies which are different from each other.

3. The display device of claim 2, further comprised of said second clock signal exhibiting a frequency which is higher than the highest of frequencies of the first clock signals.

4. The display device of claim 1, further comprising a video monitor for receiving the plurality of digital video data output from said output buffer memory circuit and providing a visual display of the video images on the basis of the plurality of digital video data.

5. The display device of claim 4, further comprised of said output buffer memory circuit comprising first and second buffer memories each for storing the plurality of digital video data, first switching means controlled by said output timing control circuit for providing a data path between said plurality of video memory circuits and said first and second buffer memories in turn, and second switching means controlled by said output timing control circuit for providing a data path between said first and second buffer memories and said video display in turn.

6. A display device for displaying video images of a plurality of channels, comprising:

a plurality of input timing control circuits for generating a plurality of first clock signals in synchronization with a corresponding plurality of horizontal synchronization signals received via first communication channels, respectively;

an output timing control circuit coupled to receive the first clock signals, for generating a second clock signal;

a plurality of analog-to-digital conversion circuits for converting a plurality of analog video signals received via second communication channels and respectively synchronized with the horizontal synchronization signals into a corresponding plurality of digital video data in synchronization with the first clock signals, respectively;

a plurality of video memory circuits for storing the plurality of digital video data, respectively, wherein writing operations of said video memory circuits are respectively controlled by said plurality of input timing control circuits in synchronization with the corresponding first clock signals and reading operations of said video memory circuits are controlled by said output timing control circuit in synchronization with the second clock signal; and an output buffer memory circuit coupled to said video memory circuits for storing the plurality of digital video data from said video memory circuits, wherein writing and reading operations of said output buffer memory circuit are controlled by said output timing control circuit in synchronization with the second clock signal.

7. The display device of claim 6, further comprised of said horizontal synchronization signals respectively exhibiting frequencies which are different from each other.

8. The display device of claim 7, further comprised of said second clock signal exhibiting a frequency which is higher than the highest of frequencies of the first clock signals.

* * * * *